US009800653B2

(12) United States Patent
Navasivasakthivelsamy et al.

(10) Patent No.: US 9,800,653 B2
(45) Date of Patent: Oct. 24, 2017

(54) MEASURING RESPONSIVENESS OF A LOAD BALANCING SYSTEM

(71) Applicant: MICROSOFT TECHNOLOGY LICENSING, LLC, Redmond, CA (US)

(72) Inventors: Arunkumar Navasivasakthivelsamy, Redmond, WA (US); Yousuk Seung, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 137 days.

(21) Appl. No.: 14/640,781

(22) Filed: Mar. 6, 2015

(65) Prior Publication Data

US 2016/0261478 A1 Sep. 8, 2016

(51) Int. Cl.
*H04L 29/08* (2006.01)
*H04L 12/26* (2006.01)
*H04L 12/803* (2013.01)

(52) U.S. Cl.
CPC .......... *H04L 67/10* (2013.01); *H04L 43/0817* (2013.01); *H04L 43/0852* (2013.01); *H04L 43/10* (2013.01); *H04L 47/125* (2013.01); *H04L 67/1029* (2013.01)

(58) Field of Classification Search
None
See application file for complete search history.

(56) References Cited

U.S. PATENT DOCUMENTS

| 8,230,055 | B2 | 7/2012 | Kondamuru et al. |
| 8,248,928 | B1 | 8/2012 | Wang et al. |
| 8,671,189 | B2 | 3/2014 | Cho et al. |
| 8,755,283 | B2 | 6/2014 | Patel et al. |
| 9,003,002 | B2 * | 4/2015 | Patel ................... H04L 61/2557 709/222 |

(Continued)

OTHER PUBLICATIONS

Bauer, et al., "Load Distribution and Balancing", In Wiley-IEEE Press, Dec. 16, 2014, 1 page.

(Continued)

*Primary Examiner* — Hassan Kizou
*Assistant Examiner* — Roberta A Shand
(74) *Attorney, Agent, or Firm* — Shook, Hardy & Bacon L.L.P.

(57) ABSTRACT

In various embodiments, methods and systems for measuring load-balancer responsiveness in a cloud computing infrastructure are provided. A plurality of requests is transmitted to a data center virtual IP (VIP), where the data center VIP is configured to receive inbound traffic for a service. A load-balancing component associated with the VIP distributes the requests to a DIP pool comprised of one or more machines, each associated with a private direct IP (DIP). Each of the machines includes a DIP node-monitoring component including a keep-alive URL for receiving keep-alive probes and a dummy service URL for receiving the plurality of requests. A latency of exclusion or inclusion of a first DIP of a first machine in the DIP pool is determined based on at least some of the requests received by the DIP node-monitoring component from the load-balancing component.

18 Claims, 5 Drawing Sheets

(56) References Cited

U.S. PATENT DOCUMENTS

| | | | |
|---|---|---|---|
| 2007/0153782 A1* | 7/2007 | Fletcher | H04J 3/1617 |
| | | | 370/389 |
| 2009/0177727 A1 | 7/2009 | Radia et al. | |
| 2009/0177775 A1 | 7/2009 | Radia et al. | |
| 2009/0307334 A1* | 12/2009 | Maltz | H04L 29/12028 |
| | | | 709/219 |
| 2010/0095008 A1 | 4/2010 | Joshi | |
| 2010/0121932 A1 | 5/2010 | Joshi et al. | |
| 2010/0302940 A1* | 12/2010 | Patel | H04L 12/4633 |
| | | | 370/230 |
| 2011/0145405 A1 | 6/2011 | Vijayaraghavan | |
| 2013/0159487 A1 | 6/2013 | Patel et al. | |
| 2013/0332597 A1 | 12/2013 | Kumar | |
| 2016/0036838 A1* | 2/2016 | Jain | H04L 63/1416 |
| | | | 726/23 |

OTHER PUBLICATIONS

Deepika, et al., "Performance Analysis of Load Balancing Algorithms in Distributed System", In Proceedings of Advance in Electronic and Electric Engineering, vol. 4, No. 1, Dec. 16, 2014, pp. 59-66.

"HA_Proxy Load Balancing leads to better Connexions Performance", Published on: Nov. 19, 2010. Available at: http://devblog.cnx.org/2010/11/haproxy-load-balancing-leads-to-better.html.

* cited by examiner

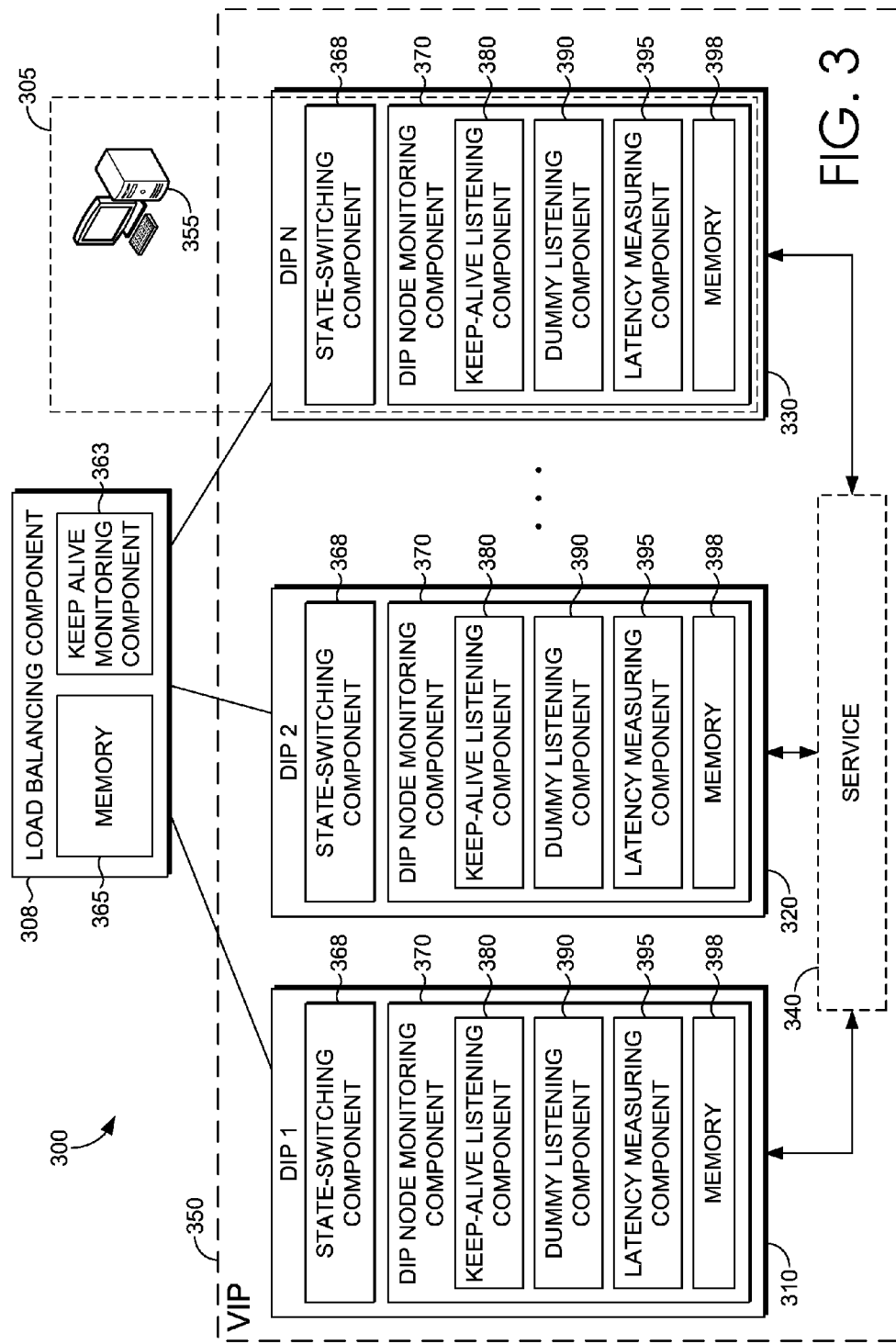

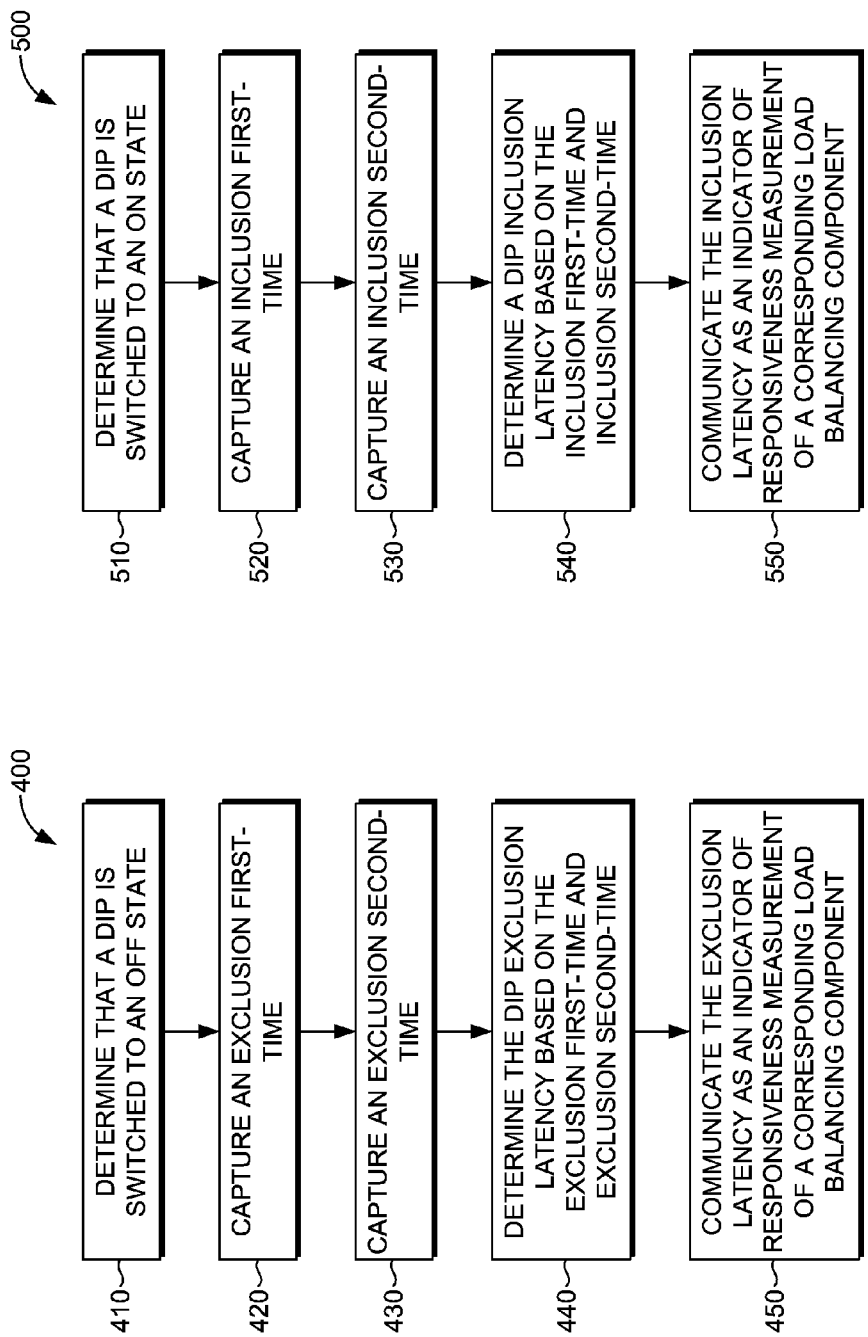

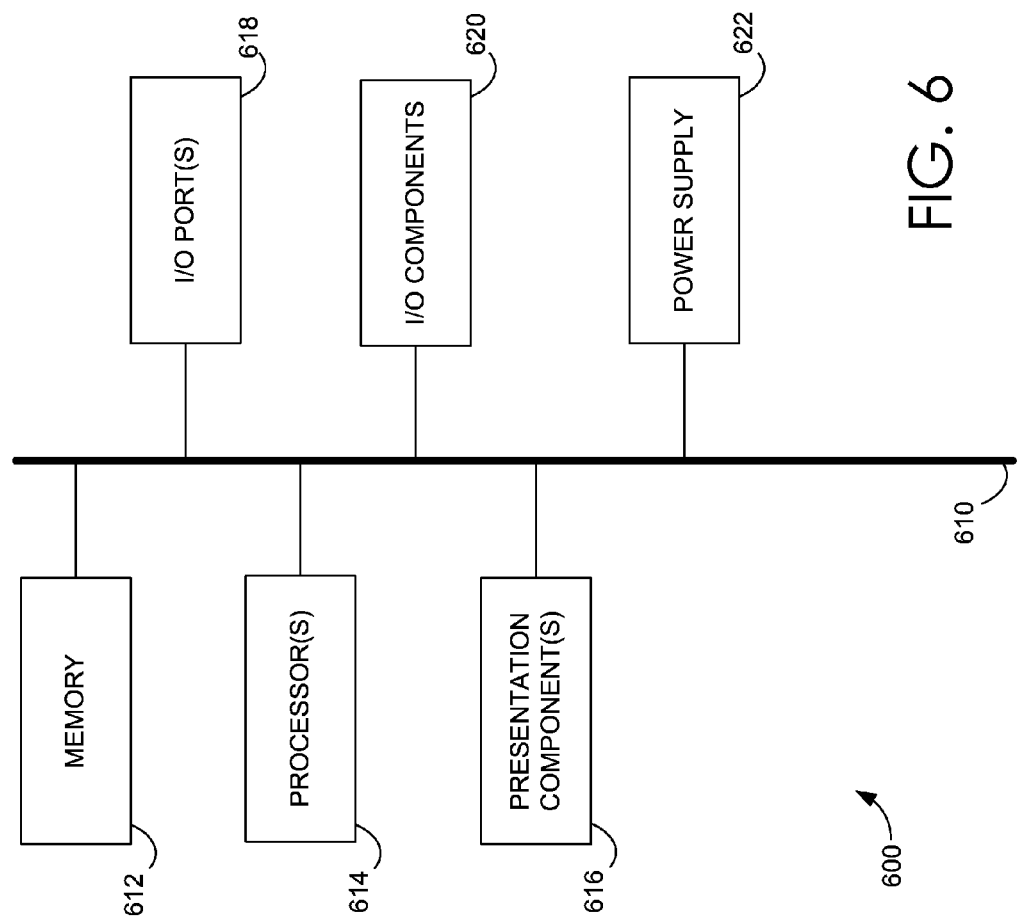

MEASURING RESPONSIVENESS OF A LOAD BALANCING SYSTEM

BACKGROUND

Load-balancing systems typically expose multiple direct endpoints of a service as a single virtual endpoint to the consumers of the service. The incoming traffic resulting from consumers of the service are distributed in a rotation or are "load-balanced" amongst a set of machines that are ready to provide the service at any particular moment in time. When determining when a particular machine in the set is ready to serve, the load balancer typically probes the machine over a predetermined HTTP URL and expects to see a positive response. If the machine fails to respond accordingly, it is removed out of the rotation for serving the incoming traffic and service requests will cease to be communicated thereto. If the machine begins responding to the probes, however, it is placed back into the rotation to serve the incoming traffic. The time taken for a load balancer to remove or add machines to the rotation is referred to as exclusion latency or inclusion latency, respectively.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to measuring load balancer responsiveness of load-balancing systems in cloud computing infrastructures. In particular, a plurality of requests are transmitted to a data center virtual IP (VIP). The VIP is configured to receive inbound traffic for a particular service, the inbound traffic and the service may be associated with a specific protocol and port. The plurality of requests is distributed, via a load-balancing component associated with the VIP, to a DIP pool. The DIP pool is comprised of one or more machines. Each of the one or more machines is associated with a private direct IP (DIP) and is configured to host the particular service. The one or more machines further include a DIP node-monitoring component having a keep-alive URL for responding to keep-alive probes and a dummy service URL for receiving the plurality of requests. A latency of exclusion or inclusion is determined for a DIP of a machine in a rotation of the one or more machines in the DIP pool. The determination of the latency of exclusion or inclusion is based on at least some of the plurality of requests received by the DIP node-monitoring component of the one or more machines from the load-balancing component.

In some embodiments described herein, the one or more machines of a DIP pool, each associated with a private DIP, may employ, among other things, a DIP node-monitoring component having a keep-alive URL and a dummy URL, both on a shared port and configured to react to requests distributed by the VIP. The keep-alive URL is configured to respond to keep-alive probes based on a state of the machine, while the dummy URL is configured to track incoming requests at all times, regardless of the machine state. Latency of exclusion or inclusion is determined based at least on responses from the keep-alive URL, and further based on requests tracked by the dummy URL.

BRIEF DESCRIPTION OF THE DRAWINGS

The embodiments described herein are described in detail below with reference to the attached drawing figures, wherein:

FIG. 3 is a schematic of an exemplary load-balancing framework, in accordance with embodiments described herein;

FIG. 4 is a flow diagram showing an exemplary method for measuring load-balancer responsiveness, in accordance with embodiments described herein;

FIG. 5 is a flow diagram showing an exemplary method for measuring load-balancer responsiveness, in accordance with embodiments described herein; and FIG. 6 is a block diagram of an exemplary computing environment suitable for use in implementing embodiments described herein.

DETAILED DESCRIPTION

Figure 1:
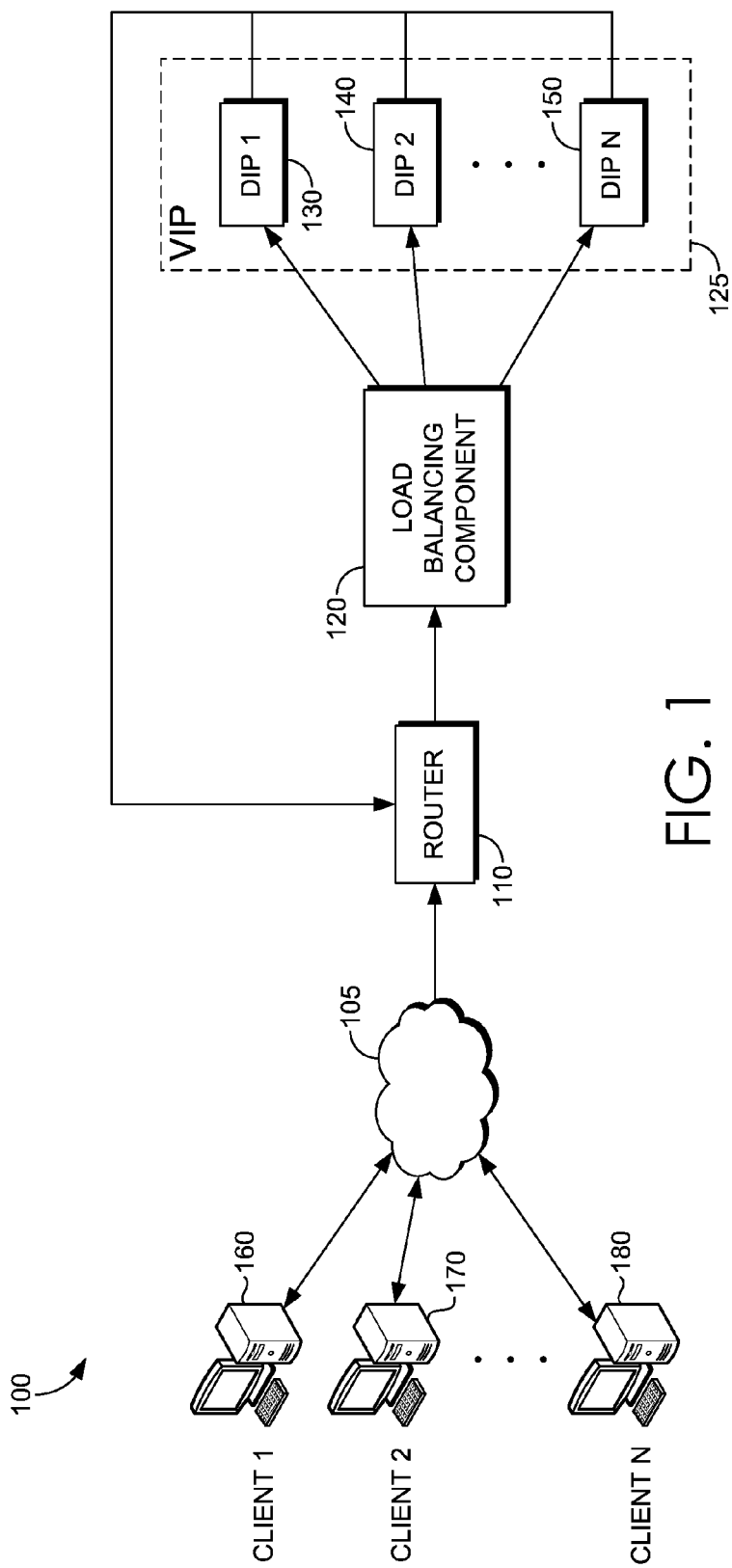
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments described herein are described with reference to a load balanced operating environment supported by a cloud computing platform, the load balanced operating environment includes one or more endpoints of a service (herein also referred to as Direct IPs or DIPs) as a single virtual endpoint (herein also referred to as Virtual IPs or VIPs) to the consumers of the service. Components can be configured for performing novel aspects of different embodiments, where configured for comprises programmed to perform particular tasks or implement particular abstract data types using code. It is contemplated that methods described herein can be performed in different types of operating environments having alternate configurations of the functional components described herein. As such, the embodiments described herein are merely exemplary, and it is contemplated that the techniques described may be extended to other implementation contexts.

Embodiments described herein can be implemented on a cloud computing infrastructure that runs cloud applications and services across different data centers and geographic regions. The cloud computing infrastructure can implement a fabric controller component for provisioning and managing resource allocation, deployment/upgrade, and management of cloud applications and services. Typically, a cloud computing system acts to store data or run applications and services in a distributed manner. The application and service components of the cloud computing infrastructure may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing infrastructures, multiple servers may be used to run the applications and services to perform data storage operations in a cluster. In particular, the servers may perform data operations independently but exposed as a single device referred to as a cluster. Each server in the cluster may be referred to as a node. Applications and services are used interchangeably herein.

A cloud computing infrastructure can support different types of services, such as, computing, storage, content delivery, networking, and security. When a service is being supported by a cloud computing infrastructure or cloud, the service includes a collection of virtual or native machines managed in combination with each other. Each machine can be assigned a private Direct IP (DIP) address, while the service is assigned one public Virtual IP (VIP) address. Traffic crossing the service boundary, e.g., to the Internet or to back-end services within the same data center such as storage, uses the VIP address. A service exposes zero or more external endpoints that each receives inbound traffic. It is contemplated that inbound traffic can be received using a specific protocol and port on the VIP.

A load balancer in a cloud computing infrastructure can be configured to distribute inbound traffic. In particular, traffic directed to an internal endpoint in the cloud computing infrastructure can be load-balanced through the VIP, or by a load-balancing component associated therewith, to DIPs of one or more machines of the service. Load-balancing distributes inbound traffic across the one or more machines to optimize resources, maximize throughput, minimize response time, and avoid overload of any single resource.

A load-balancing component can facilitate maintenance functionality in a cloud computing infrastructure. By way of example, downtime of service-providing machines in a cloud computing infrastructure may be unavoidable and is, at times, necessary. As such, machines may, among other things, undergo routine maintenance, require restart after a crash or update, or simply fail due to hardware malfunctions. When service-providing machines in the cloud computing infrastructure are unavailable, or in other words "down," they must be removed from the rotation of serving traffic distributed by the load balancer until they are once again available, or in other words "ready," to provide the service. To determine whether a particular service-providing machine is ready to be placed into the traffic-servicing rotation at any given time, the load-balancing component associated with a VIP must be aware of the machine state.

In one implementation, the load-balancing component associated with the VIP probes the service-providing machines at their DIPs, at a predetermined HTTP URL, with a keep-alive probe. The service-providing machines receive the keep-alive probes at the predetermined HTTP URL and, in return, respond with a positive receipt acknowledgement. In the event a particular service-providing machine is down, the keep-alive signal may be received, but a positive acknowledgment from the service-providing machine is not returned. As a result, the machine is removed out of the traffic-servicing rotation by the load-balancing component until it, once again, responds to the keep-alive probes sent by the load-balancing component, which at such time, it is placed back into the traffic-servicing rotation.

Traditional load-balancing components can collect data related to machine states and corresponding keep-alive response times. In this regard, a load-balancing component can be associated with predetermined latency values. Predetermined latency values can refer to expected latencies (e.g., exclusion latency and inclusion latency) that are based on default configuration of the cloud computing infrastructure components. It is contemplated that predetermined latency values can also be based on metrics observed for the cloud computing components while in operation. As such, load-balancing components can have the predetermined latency values as published numbers on the time taken to remove DIPs out of a rotation once they stop responding to keep-alive probes (herein also referred to as a published "exclusion latency"), or on the time taken to place DIPs into rotation once they start responding to the keep-alive probes (herein also referred to as a published "inclusion latency").

It is further contemplated that the predetermined latency values, as published numbers, can be communicated to customer (e.g., another computing device) of the cloud computing infrastructure as expected operational parameters (e.g., service level agreements) for components in the cloud computing infrastructure. For example, a cloud computing infrastructure provider, for a particular data center, may report that it typically takes about 9 seconds to remove a DIP out of rotation, and about 60 seconds to place the DIP back into rotation. In practice, however, these values can differ substantially from the published values at any given time. By continuously measuring how closely these published numbers match the values seen in near real-time, the load-balancing component can be evaluated and diagnosed for, among other things, traffic black-holing, inefficient use of resources, and general issues related to responsiveness.

In accordance with embodiments described herein, methods for determining load balancer responsiveness in a cloud computing infrastructure can be provided. In this regard, as opposed to determining latency of exclusion or inclusion based on whether a DIP is available for servicing traffic determined solely on an acknowledgement of received keep-alive probes by an available DIP, the embodiments described herein are directed to receiving all requests at the DIP, regardless of its availability, and logging relevant data for measuring precisely when the DIP is available or unavailable for servicing traffic thereto. In this way, data can be analyzed and compared to published numbers for further analysis. In other words, by placing measurements of latency of exclusion or inclusion at the DIP, as opposed to the load-balancing component, improved latency values can be provided for determining load balancer responsiveness.

Embodiments described herein provide improved methods and systems for determining latency of exclusion or inclusion of one or more DIPs in a service-providing rotation of a data center using a DIP node-monitoring component and a state-switching component associated with each of the one or more DIPs. As opposed to traditional methods of determining latency, which is performed on the load-balancing component associated with the VIP, the DIP node-monitoring component associated with each of the one or more DIPs provides at least a keep-alive URL for responding to keep-alive probes, and a dummy service URL for receiving requests from the load-balancing component. More specifically, the keep-alive URL performs similarly to the traditional keep-alive URL, whereby an acknowledgment of receipt is returned to the load-balancing component upon receiving the keep-alive probe when the machine is in a ready state. The addition of the dummy service URL, however, allows the DIP to track service requests sent thereto, regardless of the machine state (e.g., available or unavailable). The state-switching component, as will be described, is configured to simulate an unavailable state of a DIP. In this regard, the DIP node-monitoring component of each DIP is configured to track, based on times measured by at least the state-switching component and dummy service URL, latencies associated with when a machine is actually available or unavailable and when a load-balancing component associated therewith is aware and acts on the machine's availability or unavailability.

Accordingly, in a first embodiment described herein, a system that performs a method for measuring load-balancer responsiveness is provided. The system includes a processor and memory with computer-executable instructions embodied thereon that, when executed by the processor, performs the method. The system includes a traffic generator component, a load-balancing component, and a DIP instance having a DIP instance monitoring component. The traffic generator component is configured for generating a plurality of incoming requests that are communicated to a virtual Internet Protocol (VIP). The load-balancing component is configured for receiving the plurality of incoming requests destined to the VIP, and communicating to one or more direct Internet Protocol (DIP) instances the plurality of incoming requests. The plurality of incoming requests is communicated using the load-balancing component. The DIP instance monitoring component of the DIP instance is configured for initializing a keep-alive listening component and a dummy listening component. The DIP instance in an on-state responds to incoming keep-alive probes on the keep-alive listening component and incoming requests on the dummy listening component. The DIP instance in an off-state responds to incoming requests on the dummy listening component. The DIP instance monitoring component is also configured for determining a DIP exclusion latency and inclusion latency for the DIP instance. The DIP instance monitoring component is further configured for communicating at least one of the exclusion latency and the inclusion latency as an indicator of responsiveness measurement of a corresponding load-balancing component, to facilitate configuration of the load-balancing component.

In a second embodiment described herein, one or more computer storage media having computer-executable instructions embodied thereon that, when executed, by one or more processors, causes the one or more processors to perform a method for measuring load-balancer responsiveness are provided. The method includes determining that a direct Internet Protocol (DIP) instance is switched to the off-state. The DIP instance in an on-state responds to incoming keep-alive probes on the keep-alive listening component, and to incoming requests on the dummy listening component. The DIP instance in an off-state responds to incoming requests on the dummy listening component. The method also includes capturing an exclusion first-time and an exclusion second-time. The exclusion first-time indicates when the DIP instance is switched to the off-state. The exclusion second-time, occurring after the exclusion first-time, indicates a latest time an incoming request is received at the dummy listening component. The method further includes determining the DIP exclusion latency based on the exclusion first-time and the exclusion second-time. The DIP exclusion latency specifies a latency time that indicates a period between when the DIP instance is in an off-state and when the DIP instance stops receiving incoming requests. The method further includes communicating the exclusion latency as an indicator of a responsiveness measurement of a corresponding load-balancing component, to facilitate configuration of the load-balancing component.

In a third embodiment described herein, a computer-implemented method for measuring load-balancer responsiveness is provided. The method includes determining that a direct Internet Protocol (DIP) instance is switched to an on-state. The DIP instance in an on-state responds to incoming keep-alive probes on the keep-alive listening component, and to incoming requests on the dummy listening component. The DIP instance in an off-state responds to incoming requests on the dummy listening component. The method also includes capturing an inclusion first-time and an inclusion second-time. The inclusion first-time indicates when the DIP instance is switched to an on-state, whereas the inclusion second-time, occurring after the inclusion first-time, indicates an earliest time an incoming request is received by a dummy listening component. The method further includes determining a DIP inclusion latency based on the inclusion first-time and the inclusion second-time. The DIP inclusion latency indicates a latency time that indicates a period between when the DIP instance is in an on-state and when the DIP instance starts receiving incoming requests. The method further includes communicating the DIP inclusion latency as an indicator of an inclusion latency responsiveness measurement of a corresponding load-balancing component to facilitate configuration of the load-balancing component.

Referring now to FIG. 1, FIG. 1 illustrates an exemplary cloud computing infrastructure 100 in which implementations of the present disclosure may be employed. In particular, FIG. 1 shows a high level architecture of the cloud computing infrastructure 100 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the cloud computing infrastructure 100 includes a cloud computing platform 105 having at least one router 110, at least one load-balancing component 120 associated with at least one VIP 125, and DIP nodes 130, 140, 150 associated with the at least one VIP 125. The DIP nodes may be embodied as virtual machines (VMs) residing in one or more host nodes (for example, grouped together within an exemplary host node associated with the at least one VIP 125), each host node comprising a host agent (not shown) for directing traffic to specific virtual machines based on its associated DIP address. The cloud computing platform is configured to service clients 160, 170, and 180. Each node and client can reside on any type of computing device, which may correspond to computing device 600 described with reference to FIG. 6 for example. The components of the cloud computing infrastructure 100 may communicate with each other over a network, which may include, without limitation, one or more local area networks (LANs) and/or wide area networks (WANs). Any number of nodes (e.g., servers) and client computing devices may be employed within the cloud computing infrastructure 100 within the scope of implementations of the present disclosure.

In cloud computing infrastructure 100 supported by the cloud computing platform 105, the nodes, such as nodes 130, 140, and 150, are utilized to store and provide access to data in the storage of cloud computing platform 105. The cloud computing platform 105 also may be a public cloud, a private cloud, or a dedicated cloud. The cloud computing platform 105 may include a data center configured to host and support operation of endpoints in a particular service application. The phrase "application" or "service" as used herein broadly refers to any software, or portions of software, that run on top of, or accesses storage locations within, the data center. In one embodiment, one or more of the endpoints may represent the portions of software, component programs, or instances of roles that participate in the service application. Also clients 160, 170, and 180 may be configured to access the data, run applications for accessing the data, or be linked into an application or a service supported by the cloud computing platform 105.

Having described various aspects of the cloud computing infrastructure 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2:
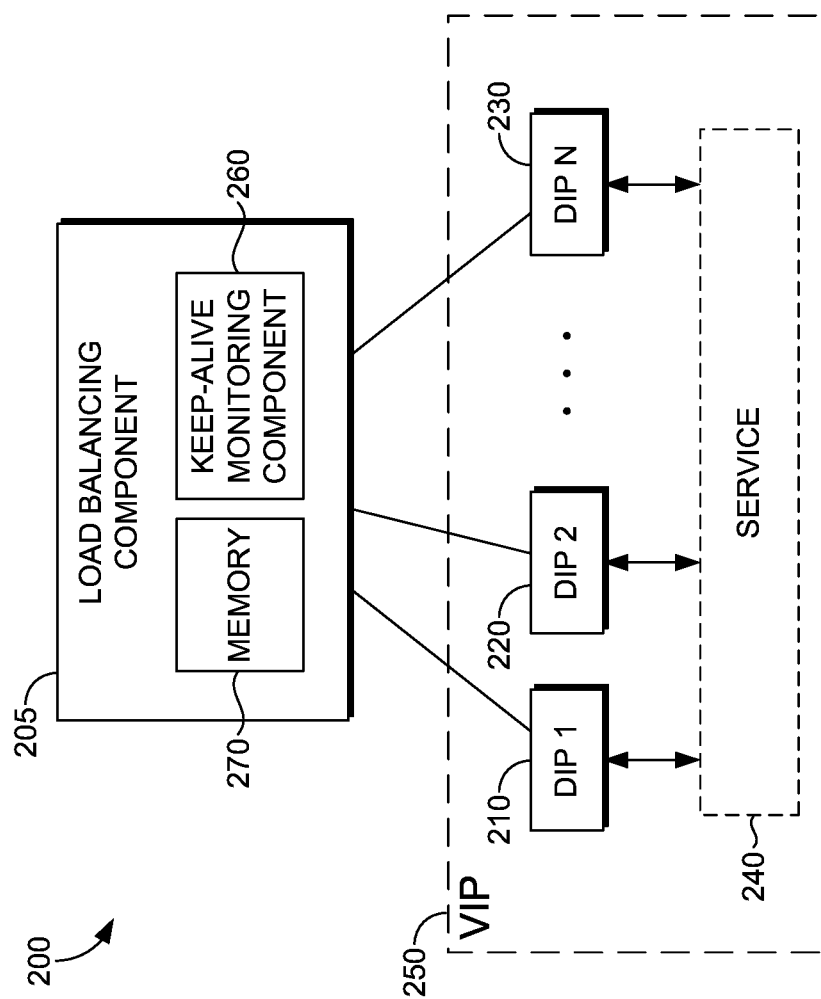
FIG. 2 is a schematic of an exemplary load-balancing framework, in accordance with embodiments described herein.

With reference to FIG. 2, FIG. 2 includes a load-balancing framework 200 of the cloud computing infrastructure. The load-balancing framework 200 and functionality supported therein can be described by way of an exemplary operating environment. The load-balancing framework 200 can include one or more VIP(s) 250 each associated with multiple endpoints (herein also referred to as DIP nodes, Direct IPs or DIPs) 210, 220, 230 of a service 240. The load-balancing component 205 is configured to distribute traffic directed to the VIP 250 to its associated DIP nodes 210, 220, 230 by balancing service requests across the DIP nodes 210, 220, 230 and preventing any particular DIP node from becoming a single point of failure, while also improving overall responsiveness of the service 240.

The DIP nodes 210, 220, 230 can be computing devices corresponding to computing device 600 described with reference to FIG. 6, or can be computing devices embodied as virtual machines (VMs), also corresponding to computing device 600, configured to operate in a virtual environment of one or more VM hosts further corresponding to computing device 600. In some configurations, the DIP nodes associated with a VIP can be in any configuration including any combination of virtual machines and/or computing devices. The DIP nodes 210, 220, 230 are in communication with their associated VIP over a network and are each configured to provide access to service 240 to clients (not shown) that request access to the service 240 through the VIP 250. The DIP nodes 210, 220, 230 can individually or in combination, host one or more services within the cloud computing infrastructure. The service 240, also referred to herein as the "application," can be any software, or portions of software, that run on top of, or accesses storage locations within, the cloud computing infrastructure. Although shown apart from the DIP nodes, it is contemplated that the service 240 is hosted individually and/or collectively by each DIP node. In some embodiments, one or more of the DIP nodes may represent the portions of software, component programs, or instances of roles that participate in the service application.

At any given time, one or more DIP nodes of the load-balancing framework 200 can fail to host the service. DIP node failure can be attributed to, among other reasons, hardware failure, maintenance, memory issues, system failures and/or software updates. To monitor whether the load-balancing component is to distribute traffic to any particular DIP node at any given time, load-balancing components may implement a keep-alive monitoring component 260. The keep-alive monitoring component 260 can provide a function of the load-balancing component 205 configured to determine whether any particular DIP node from a set of DIP nodes 210, 220, 230, in a rotation for hosting the service 240, is available or unavailable to receive network traffic. In some embodiments, the keep-alive monitoring component 260 probes a DIP node within the rotation over a predetermined HTTP URL, expecting to receive a positive (i.e., successful) acknowledgement response. In the event that the DIP node fails to acknowledge receipt of the keep-alive probe, the load-balancing component 308 will detect the failed response (i.e., unsuccessful), flag the DIP node as unavailable, and remove the DIP node from the set of DIP nodes in the rotation. Failure to acknowledge receipt of the keep-alive probe can be attributed to any one or more DIP node failures as described herein above. In embodiments, after detecting the failure and removing the DIP node marked unavailable from the rotation, the keep-alive monitoring component 260 may continue to send keep-alive probes to the DIP node. If the event that the DIP node begins to once again respond to the probes, the load-balancing component 205 will mark the DIP node as available and place the DIP node back into the rotation for hosting the service 240. As described herein, the keep-alive monitoring component 260 is described as an example only and is not intended to be limiting. It is considered within the scope of the present invention to employ other methodologies, originating from within the load-balancing component 205, to probe the DIP nodes 210, 220, 230 and determine a status of availability for hosting the service 240.

In some embodiments, the keep-alive monitoring component 260 may keep a log of timestamps associated with successful and/or unsuccessful keep-alive probes. The log can be stored in a memory 270 and used to calculate an average published time associated with a latency of exclusion and a latency of inclusion. The average published time can be made generally available to system administrators for viewing, or to other components of the system for acting on the data, as will be discussed in more detail herein. In embodiments, and as found in traditional load-balancing components, the published time associated with a latency of exclusion can be calculated using the difference of timestamps logged from when a DIP node starts failing to respond to keep-alive probes and when the DIP node is removed out of the service rotation. In the same regard, the published time associated with a latency of inclusion can be calculated using the difference of timestamps logged from when a DIP node starts responding to keep-alive probes and when the DIP node is placed back into the service rotation. The methods for calculating published times associated with latency of exclusion and inclusion using data corresponding to keep-alive probes are merely exemplary and are not intended to be limiting. It is considered within the scope of the present invention to employ other methods of measuring exclusion and/or inclusion latency based on timed probes from the keep-alive monitoring component 260 or an equivalent thereof.

At times, the traditional method for measuring exclusion and/or inclusion latency can be inaccurate. For instance, response times from DIP nodes can be delayed for any number of reasons including, among other things, network latency, network device lag, or overloading of resources. Further, the process of placing a DIP node back into a service rotation or removing a DIP node from the service rotation can also be delayed for various reasons. In this regard, an administrator may find the published times associated with exclusion and inclusion latency to be inaccurate. As such, calculations for exclusion and/or inclusion latency can be more accurately determined from the DIP, as opposed to the load-balancing component, as a more accurate determination can be made from the DIP node endpoint for determining when a DIP node is available or unavailable.

With reference now to FIG. 3, a load-balancing framework 300 incorporating a DIP latency monitoring service 305 is illustrated in accordance with embodiments of the present invention. The load-balancing framework 300 may include any or all components described in regards to load-balancing framework 200 of FIG. 2, particularly incorporating aspects necessary to enable the deployment of a load-balanced service. As similarly described in FIG. 2, load-balancing framework 300 can include at least one load-balancing component 308 configured to distribute traffic (e.g., probes or service requests) directed to one or more VIP(s) 350 to its associated DIP nodes 310, 320, 330. The VIP(s) 350 can each be associated with multiple endpoints (DIP nodes, Direct IPs, or DIPs) 310, 320, 330 of a service 340. The load-balancing component 308 is configured to distribute traffic directed to the VIP 350 to its associated DIP nodes 310, 320, 330 by balancing service requests across the DIP nodes and preventing any particular DIP node from becoming a single point of failure, while also improving overall responsiveness of the service.

The DIP latency monitoring service 305 is configured to accurately determine latency of inclusion and exclusion from the DIP node 310, 320, 330 endpoint, as opposed to the traditional and potentially inaccurate method of measuring latency times from the load-balancing component 308. The DIP latency monitoring service 305 can comprise a traffic generator 355, DIP node state-switching component(s) 368 associated with each DIP node 310, 320, 330, and DIP node monitoring component(s) 370 also associated with each DIP node 310, 320, 330. As will be described in more detail herein, the DIP node monitoring component(s) 370 can include a keep-alive listening component 380, a dummy listening component 390, a latency measuring component 395, and a memory 398.

The traffic generator 355 can be a standalone networking device or computing device, which may correspond to computing device 600 described with reference to FIG. 6. The traffic generator 355 is in direct network communication with the load-balancing component 308, and is in further communication with any or all endpoints within the load-balancing framework 300 through the load-balancing component 308. The traffic generator 355 is configured to send continuous "dummy" service requests to the load-balancing component at a predetermined rate predetermined rate (i.e., "n" requests per second), with the destination address set as the VIP. The term "dummy" service requests is used herein to refer to fabricated service requests that simulate external service requests typically originating by service-requesting clients. The load-balancing component 308 is configured to distribute traffic directed to the VIP 350 to its associated DIP nodes 310, 320, 330 by balancing traffic (e.g., actual service requests, keep-alive probes, and dummy service requests from traffic generator 355) across the DIP nodes and preventing any particular DIP node from becoming a single point of failure, as described above. The DIP node monitoring component(s) 370 can be configured to determine latency, as will be described. The traffic generator 355 is configured to simulate a constant incoming stream of service traffic from an external source so that the DIP latency monitoring service 305 can provide a measurement of load-balancer responsiveness at any given time, as will be described.

The DIP nodes 310, 320, 330 can each include a state-switching component 368 configured to control the availability of the DIP node by switching it into a simulated off-state or on-state for purposes of measuring load balancer responsiveness, as will be described herein. For instance, the state-switching component 368 can intentionally place the DIP node into a mode of simulated unavailability that ceases the DIP node's ability to service incoming traffic. The state-switching component 368 can be configured to place the DIP node into the off-state for a duration that is predetermined or randomly drawn from a configured range (e.g., 2 seconds to 300 seconds). Similarly, the state-switching component 368 can intentionally place the DIP node back into a mode of availability that allows the DIP node to service incoming traffic. The state-switching component 368 can be configured to place the DIP node into the on-state for a predetermined duration period or a duration period that is randomly drawn from a configured range. The state-switching component can also reference a probability mechanism for determining the next state as either the on-state or off-state, where when an existing state is selected a corresponding duration period of the existing state is extended.

In some embodiments, a state-switching controller component (not shown) can be in communication with the state-switching component(s) to regulate the state of the DIP nodes, particularly to avoid undesirable situations where too many DIP nodes are switched into an off-state and unable to service incoming traffic. The state-switching controller component can be included as a component of the load-balancing component 308, traffic generator 355, or other network component or device in communication with the DIP nodes. In embodiments, DIP state indicators and timestamps associated with the switching events facilitated by state-switching component 368 can be logged by a memory (not shown) of the state-switching component, or communicated to another component of the system (for instance, memory 398 of the DIP node monitoring component). The ability to purposefully cause a DIP node to become unavailable or available at any given time can assist in data collection and interpretation to determine load balancer responsiveness, as will be described herein.

The DIP nodes 310, 320, 330 can each include DIP node monitoring component 370 configured to receive the keep-alive probes communicated from the load-balancing component 308 and further measure a latency of exclusion and/or inclusion using the latency measuring component 395. The DIP node monitoring component 370 can include a keep-alive listening component 380 configured to receive keep-alive probes, and a dummy listening component 390 configured to receive dummy service traffic including dummy service requests.

The keep-alive listening component 380 can be configured to receive the keep-alive probes and return an acknowledgment of the receipt, as was described in FIG. 2 with regard to the predetermined HTTP URL configured within the DIP node. In embodiments, the keep-alive listening component 380 can be, as was described with regard to the predetermined HTTP URL of FIG. 2, a predetermined HTTP URL on a predetermined port of the service 340 that can return acknowledgments of keep-alive probes received when the DIP node is available to provide the service 340. To this end, the predetermined HTTP URL will also fail to return acknowledgement of keep-alive probes delivered thereto when the DIP node is truly or simulated as unavailable.

Other implementations of the keep-alive listening component 380 may be considered within the scope of the present invention. For example, the keep-alive listening component 380 could be implemented as software or firmware apart from the service 340, to receive probes and send acknowledgements of receipts only when the service 340 is available. Further, the probes may be employed as network pings or other network requests that typically receive acknowledgment upon receipt. The implementation of HTTP URLs and ports associated therewith are merely exemplary and are not intended to be limiting. It is contemplated that any network protocol and port(s) can be implemented employed to facilitate implementation of the embodiments described herein.

The dummy listening component 390 can be configured to receive dummy service traffic including dummy service requests communicated to the DIP node monitoring component 370, notwithstanding the state of the DIP node's availability to host the service 340. Similar to that of keep-alive listening component 380, the dummy listening component 390 is configured to listen to a predetermined HTTP URL on a predetermined port of the service 340. The predetermined HTTP URL and port of the dummy listening component 390 may be affixed to the name of the associated VIP to correspond to the VIP at any given time. In this regard, multiple VIPs associated with multiple load balancing components 308 can be monitored with a single DIP latency monitoring service 305. In more detail, traffic generator 355 may send dummy service requests to multiple VIPs using unique VIP names associated therewith, so that DIP nodes can easily keep track of latency for each VIP even though all share the same HTTP URL and port. Traffic destined to a particular VIP associated with a failing load-balancing component 308 could potentially arrive at a DIP node that it otherwise would not and, as a result, the DIP node could report undesirable latency measurements with that particular VIP. To this end, the failing load-balancing component 308 can be easily determined.

The latency measuring component 395 can be configured to log and perform calculations on timestamps in a memory 398. The timestamps may correspond with timestamp information received from the state-switching component 368 and/or timestamps associated with keep-alive probes and/or requests communicated to the DIP node monitoring component 370. The timestamp information and calculations performed thereon can produce a measurement for a DIP exclusion latency or a DIP inclusion latency.

The DIP exclusion latency specifies a latency time that indicates a period between when a particular DIP is switched to an off-state and when the DIP stops receiving incoming requests. The DIP exclusion latency is particularly useful for measuring delays associated with a load-balancing component becoming aware that a particular DIP is unavailable. A high DIP exclusion latency can indicate, among other things, that a load-balancing component is sending traffic requests to an unavailable DIP (i.e., "black-holing" traffic). In embodiments, the DIP exclusion latency can be determined by first determining that a DIP has been switched to an off-state by determining that the DIP has failed to respond to a predetermined number of keep-alive probes (e.g., 3 unsuccessful keep-alive probes). A timestamp associated with this off-state event can be logged as an exclusion first-time, which serves as a reference point to measure a duration ending at an exclusion second-time.

As one of ordinary skill in the art may appreciate, the keep-alive listening component 380 of the DIP is non-functional as the DIP is in an off-state. As such, the exclusion second-time can be captured by the latest time that an incoming dummy service request is received, after the first time, at the dummy listening component 390 of the DIP. The difference between the exclusion first-time and exclusion second-time can indicate an exclusion latency associated with a DIP, the exclusion latency measuring a precise duration between when a load-balancing component takes the DIP out of the service rotation and the actual time the DIP became unavailable.

The DIP inclusion latency, on the other hand, specifies a latency time that indicates a period between when a particular DIP is switched to an on-state and when the DIP starts receiving incoming requests. The DIP inclusion latency is particularly useful for measuring delays associated with a load-balancing component becoming aware that a particular DIP has become available. A high DIP inclusion latency can indicate, among other things, that a load-balancing component is wasting available resources (e.g., available DIPs). In embodiments, the DIP inclusion latency can be determined by first determining that a DIP has been switched to an on-state by determining that the DIP has successfully responded to a predetermined number of keep-alive probes (e.g., 3 successful keep-alive probes). A timestamp associated with the on-state event can be logged as an inclusion first-time, which serves as a reference point to measure a duration ending at an inclusion second-time.

The inclusion second-time can be captured by an earliest time that an incoming request is received, after the inclusion first-time, at the dummy listening component 390 of the DIP. The difference between the inclusion first-time and inclusion second-time can indicate an inclusion latency associated with a DIP, the inclusion latency measuring a precise duration between the actual time the DIP became available and when a load-balancing component places the DIP back into the service rotation.

As described above, the state-switching component 368 can change the state of the DIP node(s) and log precise timestamps of availability or unavailability. By comparing the start time of service requests receipts with a precise time of DIP node availability, a latency of inclusion can be accurately determined. Further, by comparing the stop time of service request receipts with a precise time of DIP node unavailability, a latency of exclusion can also be accurately determined. In embodiments described herein, each DIP node in a load-balanced framework can be responsible for tracking its own latency of exclusion or inclusion. Each DIP node can be further configured to communicate its own latency of exclusion or inclusion to other components within the cloud computing infrastructure to further facilitate configuration of the load-balancing component 308.

In some embodiments, the latency of exclusion or inclusion determined by any particular DIP node and performed by the processes of latency measuring component 395 can be aggregated over time and plotted as a time-series graph for analysis by an administrator. The constant flow of simulated traffic communicated by traffic generator 355 to the load-balancing component 308 facilitates the DIP latency monitoring service's 305 ability to provide continuous measurements of latency of exclusion or inclusion. The time-series graph can be used for comparison with a published time associated with a latency of exclusion or inclusion to diagnose potential issues with the load-balancing component. The comparison can be performed manually by an administrator or automatically by, for instance, keep-alive monitoring component 260 of FIG. 2 or other components employed in the load-balancing framework 200.

The comparison of latency values to published times associated therewith can potentially diagnose various issues with the load-balancing component. Published latency times can serve as threshold values for making determinations that the load-balancing component is having problems at any given time, provided a measured latency value of inclusion or exclusion from the DIP endpoint in accordance with embodiments described herein. For example, a latency of exclusion value that is much higher than a published time associated therewith can indicate that the load-balancing component is sending incoming traffic to an unavailable DIP node without informing clients that the requests did not reach the intended DIP node (also referred to as "blackholing"). Similarly, a latency of inclusion value that is much higher than a published time associated therewith can indicate that available DIP nodes are not being utilized and resources are being wasted or not maximizing available resources.

Other diagnosis can be made using DIP node-provided latencies of exclusion and inclusion. For example, the data associated with these latencies can be utilized to measure load-balancing component responsiveness and further determine other root-cause issues related to load-balance services. Further, a performance component (not shown) can be implemented to reference at least one of the exclusion latency or the inclusion latency to perform at least one of the performance remedial operations. Performance remedial operations can include communicating an indication to perform a partitioning operation on a cluster comprising the VIP to improve a load-balancing load of the load-balancing component; communicating alarms based on the exclusion latency or the inclusion latency exceeding defined thresholds values; and communicating to an interface component one or more monitoring health reports based on the exclusion latency or the inclusion latency, where the one or more health reports indicate an issue with the load-balancing component. Other variations and combinations of performance remedial operations are contemplated with embodiments described herein.

Turning now to FIG. 4, a flow diagram is provided that illustrates a method 400 for measuring load-balancer responsiveness in a cloud computing infrastructure. Initially at block 410, it is determined that a direct Internet Protocol (DIP) instance is switched to an off-state. In embodiments, the DIP instance in an on-state responds to incoming keep-alive probes on a keep-alive listening component (for instance, keep-alive listening component 380 of FIG. 3) and service requests on a dummy listening component (for instance, dummy listening component 390 of FIG. 3). The DIP instance in the off-state responds to incoming service requests on the dummy listening component. At block 420, an exclusion first-time is captured. The exclusion first-time indicates when the DIP instance is switched to the off-state (for instance, by state-switching component 368 of FIG. 3). At block 430, an exclusion second-time is captured. The exclusion second-time indicates a latest time that an incoming service request is received at the dummy listening component. At block 440, a DIP exclusion latency is determined based on the exclusion first-time and exclusion second-time. The DIP exclusion latency specifies a latency time that indicates a period between when the DIP instance is in an off-state and when the DIP instance stops receiving incoming requests. At block 450, the exclusion latency is communicated as an indicator of a responsiveness measurement of a corresponding load-balancing component. The exclusion latency can be communicated to facilitate configuration of the load-balancing component in accordance with embodiments described herein.

Turning now to FIG. 5, a flow diagram is provided that illustrates a method 500 for measuring load-balancer responsiveness in a cloud computing infrastructure. Initially at block 510, it is determined that a direct Internet Protocol (DIP) instance is switched to an on-state. In embodiments, the DIP instance in an on-state responds to incoming keep-alive probes on a keep-alive listening component (for instance, keep-alive listening component 380 of FIG. 3) and incoming service requests on a dummy listening component (for instance, dummy listening component 390 of FIG. 3). The DIP instance in the off-state responds to incoming service requests on the dummy listening component. At block 520, an inclusion first-time is captured. The inclusion first-time indicates when the DIP instance is switched to the on-state (for instance, by state-switching component 368 of FIG. 3). At block 530, an inclusion second-time is captured. The inclusion second-time indicates an earliest time that an incoming service request is received by the dummy listening component. At block 540, a DIP inclusion latency is determined based on the inclusion first-time and inclusion second-time. The DIP inclusion latency specifies a latency time that indicates a period between when the DIP instance is in an on-state and when the DIP instance starts receiving incoming requests. At block 550, the inclusion latency is communicated as an indicator of a responsiveness measurement of a corresponding load-balancing component. The inclusion latency can be communicated to facilitate configuration of the load-balancing component in accordance with embodiments described herein.

Having briefly described an overview of embodiments of the present invention, an exemplary operating environment in which embodiments described herein may be implemented is described below in order to provide a general context for various aspects of the present invention. Referring initially to FIG. 6 in particular, an exemplary operating environment for implementing embodiments described herein is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A node having at least one processor, and at least one computer storage media storing computer-executable instructions that, when executed by the at least one processor, causes the at least one processor to:
   receive, by the node within a plurality of nodes each having a private direct IP (DIP), incoming service requests and keep-alive probes communicated from a load balancer associated with a virtual Internet Protocol (VIP);
   initialize, on the node, one of a simulated available state and a simulated unavailable state, wherein the simulated available state simulates normal functionality of the node, and wherein the simulated unavailable state simulates unavailability of the node;
   determine, on the node, at least one of a DIP exclusion latency and a DIP inclusion latency for the node,
       wherein the DIP exclusion latency is determined based on a measured duration between a first time when the node intentionally fails to respond to a predetermined number of keep-alive probes received from the load balancer, and a second time when the node stops receiving service requests from the load balancer, and
       wherein the DIP inclusion latency is determined based on a measured duration between a third time when the node successfully responds to the predetermined number of keep-alive probes received from the load balancer, and a fourth time when the node begins receiving service requests from the load balancer; and communicate, by the node, at least one of the determined DIP exclusion latency and DIP inclusion latency as an indicator of load balancer responsiveness.

2. The node of claim 1, wherein a traffic-generator component is configured to communicate the plurality of incoming service requests to the load-balancer, such that the plurality of incoming service requests simulates externally sourced incoming traffic, and wherein each of the plurality of incoming service requests is communicated at a predetermined rate.

3. The node of claim 2, wherein the VIP is a public IP address that is associated with a plurality of virtual machines (VM) each corresponding to a DIP, wherein the VIP and the plurality of VMs support a service in a cloud computing infrastructure, and wherein the VIP is employed to contemporaneously receive the plurality of incoming service requests and the external source of incoming traffic.

4. The node of claim 1, wherein the load-balancer is configured to identify one or more nodes in the plurality of nodes as belonging to a pool of active nodes by:
communicating a predetermined number of keep-alive probes to a monitored node;
determining that the monitored node is active when responses are received for each of the predetermined number of keep-alive probes;
determining that the monitored node is inactive when responses are not received for each of the predetermined number of keep-alive probes; and
identifying the pool of active nodes associated with the VIP to load-balance incoming requests to the pool of active nodes.

5. The node of claim 1, wherein the computer-executable instructions further cause the at least one processor to listen to a keep-alive URL and a dummy URL on a common port and protocol, wherein the dummy URL is affixed with the name of the VIP, such that the exclusion latency and the inclusion latency are captured for the corresponding VIP.

6. The node of claim 1, wherein a remote device in communication with the node is configured to:
control a number of nodes in the plurality of nodes that are set to the off-state or on-state, for responsive measurements, based on one of the following state-switching routines:
referencing a duration period at the start of one of the off-state and the on-state, wherein the duration period is randomly drawn from a configured range, and
configuring a probability mechanism for determining the next state as one of the on-state or the off-state, wherein when an existing state is selected, a corresponding duration period of the existing state is extended.

7. The node of claim 1,
wherein the loan balancer is configured to:
reference at least one of the exclusion latency or the inclusion latency to perform at least one performance remedial operation, the performance remedial operations comprising:
performing a partitioning operation on a cluster comprising the load-balancer to improve a load-balancing load of the load-balancer;
communicating alarms based on the exclusion latency or the inclusion latency exceeding defined thresholds values; and communicating one or more monitoring health reports based on the exclusion latency or the inclusion latency, wherein the one or more health reports indicate an issue with the load-balancer.

8. One or more non-transitory computer storage media having computer-executable instructions embodied thereon that, when executed, by one or more processors, causes the one or more processors to perform a method for measuring load-balancer responsiveness, the method comprising:
determining that a node in a plurality of nodes, each having a unique direct Internet Protocol (DIP) is switched to an off-state, wherein the node in an on-state responds to keep-alive probes on a keep-alive listening component and responds to incoming requests on a dummy listening component, and wherein the node in an off-state responds to incoming requests on the dummy listening component;
capturing an exclusion first-time, wherein the exclusion first-time indicates when the node is switched to the off-state;
capturing an exclusion second-time, wherein the exclusion second-time indicates a latest last time an incoming request is received at the dummy listening component;
determining a DIP exclusion latency based on the exclusion first-time and the exclusion second-time, wherein the DIP exclusion latency specifies a latency time that indicates a duration from when the node is in an off-state and when the node stops receiving incoming requests,
communicating the exclusion latency as an indicator of a responsiveness measurement of a corresponding load balancer associated with the node, to facilitate configuration of the corresponding load-balancer.

9. The media of claim 8, wherein the node comprises a machine, wherein the machine is one of a plurality of machines supporting a service in a cloud computing infrastructure, and wherein the node corresponds to a virtual IP (VIP) that is associated with the service.

10. The media of claim 8, wherein the node is switched to the off-state for a predetermined duration when measuring responsiveness of the corresponding load-balancer.

11. The media of claim 8, wherein a keep-alive component remote from the node and in communication with the node is configured to send keep-alive probes to the node, and wherein the keep-alive component is configured to determine that the node is inactive based on a predetermined number of keep-alive probes failing to be received by the node.

12. The media of claim 8, wherein the dummy listening component is configured to continuously receive incoming requests after the node is switched to the off-state, to capture the exclusion second-time, and wherein the keep alive component is configured to stop responding to keep-alive probes when the node is in the off-state.

13. The media of claim 8, further comprising:
determining that the exclusion latency exceeds a threshold value, wherein the threshold value is based on published numbers for the load-balancer of the node, wherein the published numbers are predetermined latency values that are expected for the load-balancer; and
communicating an indication that the load-balancer is black-holing traffic.

14. The media of claim 8, wherein the keep-alive listening component and dummy listening component are configured to contemporaneously receive incoming requests after the node is switched to the on-state, to capture the inclusion second-time.

15. A computer-implemented method for measuring load-balancer responsiveness, the method comprising:
  determining that a node in a plurality of nodes, each having a unique direct Internet Protocol (DIP), is switched to an on-state, wherein the node in the on-state responds to keep-alive probes on a keep-alive listening component and responds to incoming requests on a dummy listening component, and wherein the node in an off-state responds to incoming requests on the dummy listening component;
  capturing an inclusion first-time, wherein the inclusion first-time indicates when the node is switched to an on-state;
  capturing an inclusion second-time, wherein the inclusion second-time indicates a first time an incoming request is received at the dummy listening component;
  determining a DIP inclusion latency based on the inclusion first-time and the inclusion second-time, wherein the DIP inclusion latency indicates a latency time that indicates a duration from when the node is in an on-state and when the node begins receiving incoming requests; and
  communicating the DIP inclusion latency as an indicator of an inclusion latency responsiveness measurement of a corresponding load-balancer to facilitate configuration of the corresponding load-balancer.

16. The method of claim 15, wherein the node is switched to the on-state for a predetermined duration when measuring responsiveness of the corresponding load-balancer.

17. The method of claim 16, further comprising:
  determining that the inclusion latency exceeds a threshold value, wherein the threshold value is based on published numbers for the corresponding load-balancer, wherein the published numbers are predetermined latency values that are expected for the corresponding load-balancer; and
  communicating an indication that the load-balancer is not maximizing available resources.

18. The method of claim 15, wherein the node is determined to be active by a keep-alive component after responding to a predetermined number of keep-alive probes, wherein the keep-alive component is remote from the node and in communication with the node, and is configured to send keep-alive probes to the node.

* * * * *